US012645366B2

(12) United States Patent
Chandrashekaraiah

(10) Patent No.: US 12,645,366 B2
(45) Date of Patent: Jun. 2, 2026

(54) LIFESPAN FORECASTING OF MEMORY DEVICES AND PREDICTIVE DEVICE HEALTH MANAGEMENT

(71) Applicant: Micron Technology, Inc., Boise, ID (US)

(72) Inventor: Manjunath Chandrashekaraiah, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/643,913

(22) Filed: Apr. 23, 2024

(65) Prior Publication Data

US 2024/0272803 A1 Aug. 15, 2024

Related U.S. Application Data

(63) Continuation of application No. 17/824,749, filed on May 25, 2022, now Pat. No. 11,995,321.

(51) Int. Cl.
*G06F 3/06* (2006.01)
*G06N 20/00* (2019.01)

(52) U.S. Cl.
CPC .......... *G06F 3/0616* (2013.01); *G06F 3/0629* (2013.01); *G06F 3/0659* (2013.01); *G06F 3/0673* (2013.01); *G06N 20/00* (2019.01)

(58) Field of Classification Search
CPC .... G06F 3/0616; G06F 3/0629; G06F 3/0659; G06F 3/0673; G06N 20/00
See application file for complete search history.

(56) References Cited

U.S. PATENT DOCUMENTS

| | | | |
|---|---|---|---|
| 2012/0185638 A1* | 7/2012 | Schreiber | H04N 21/433 |
| | | | 711/E12.008 |
| 2018/0039444 A1 | 2/2018 | Yamamoto et al. | |
| 2018/0089042 A1 | 3/2018 | Demetriou et al. | |
| 2018/0174658 A1* | 6/2018 | Kikuchi | G05B 19/4063 |
| 2019/0220193 A1* | 7/2019 | Yamamoto | G06F 3/0604 |
| 2019/0278498 A1 | 9/2019 | Dedrick | |
| 2020/0004434 A1 | 1/2020 | Borlick et al. | |
| 2020/0004435 A1* | 1/2020 | Borlick | G06N 3/084 |
| 2020/0168272 A1* | 5/2020 | Ji | G11C 16/3495 |
| 2021/0096756 A1* | 4/2021 | Rajgopal | G06F 3/0616 |
| 2022/0137827 A1* | 5/2022 | Schaefer | G06F 3/0655 |
| | | | 711/154 |
| 2023/0067208 A1 | 3/2023 | Dedrick | |
| 2024/0340343 A1* | 10/2024 | Zhu | H04L 67/1097 |

OTHER PUBLICATIONS

Non-final office action, U.S. Appl. No. 17/824,749, Sep. 25, 2023, 9 pages.
Notice of Allowance, U.S. Appl. No. 17/824,749, Jan. 24, 2024, 8 pages.

* cited by examiner

*Primary Examiner* — Ryan Bertram
(74) *Attorney, Agent, or Firm* — NICHOLSON DE VOS WEBSTER & ELLIOTT LLP

(57) ABSTRACT

Exemplary methods, apparatuses, and systems including a device health manager for managing health of a memory device. The device health manager identifies a memory device having a service life. The device health manager receives multiple requests to perform one or more computing operations. The device health manager predicts, using a machine learning model, an adjustment of the service life of the memory device using the health data. The device health manager generates a notification including the adjustment of the service life.

20 Claims, 4 Drawing Sheets

FIG. 2

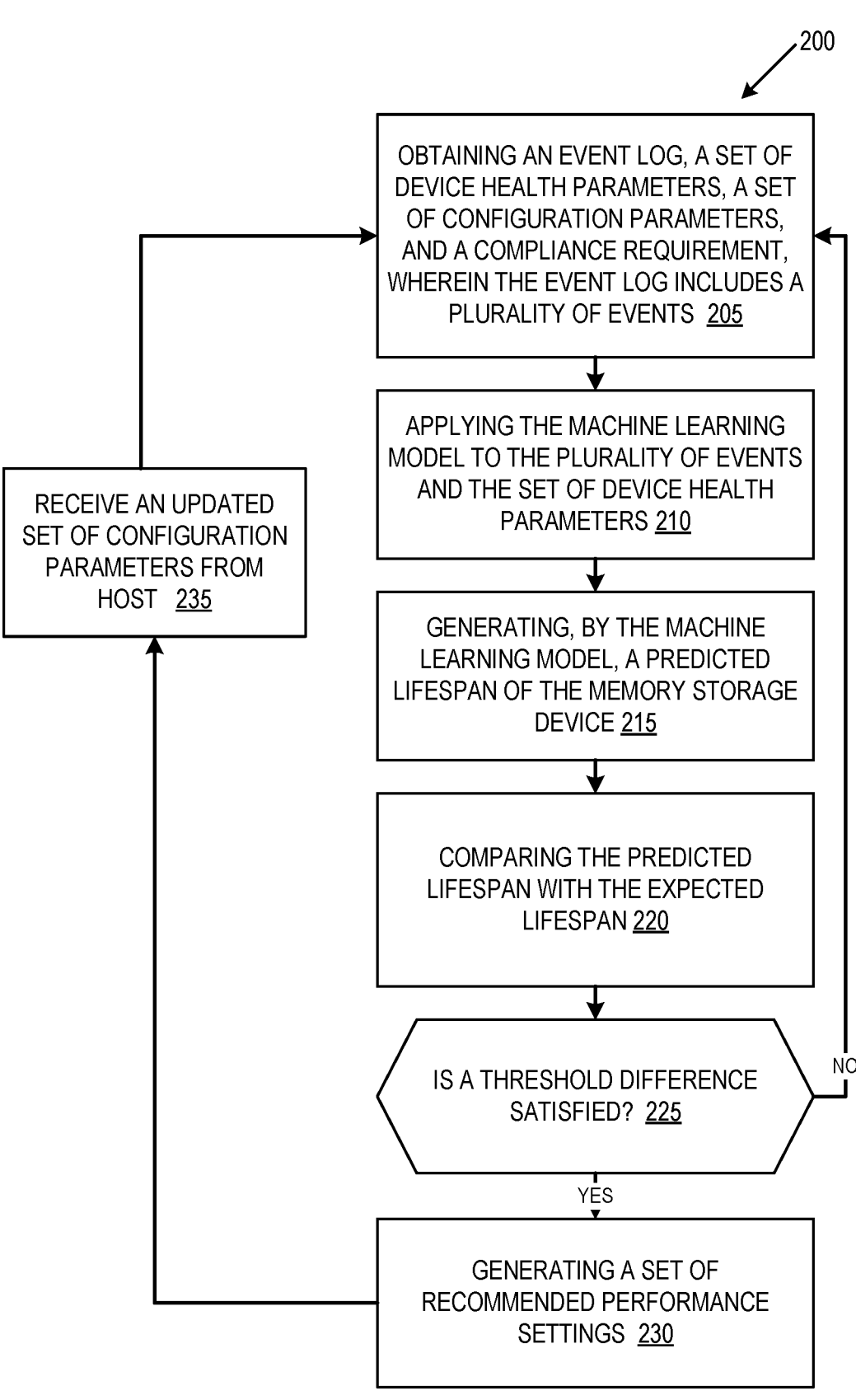

200

OBTAINING AN EVENT LOG, A SET OF DEVICE HEALTH PARAMETERS, A SET OF CONFIGURATION PARAMETERS, AND A COMPLIANCE REQUIREMENT, WHEREIN THE EVENT LOG INCLUDES A PLURALITY OF EVENTS  205

APPLYING THE MACHINE LEARNING MODEL TO THE PLURALITY OF EVENTS AND THE SET OF DEVICE HEALTH PARAMETERS 210

GENERATING, BY THE MACHINE LEARNING MODEL, A PREDICTED LIFESPAN OF THE MEMORY STORAGE DEVICE 215

COMPARING THE PREDICTED LIFESPAN WITH THE EXPECTED LIFESPAN 220

IS A THRESHOLD DIFFERENCE SATISFIED? 225

NO

YES

GENERATING A SET OF RECOMMENDED PERFORMANCE SETTINGS 230

RECEIVE AN UPDATED SET OF CONFIGURATION PARAMETERS FROM HOST  235

Figure 3:
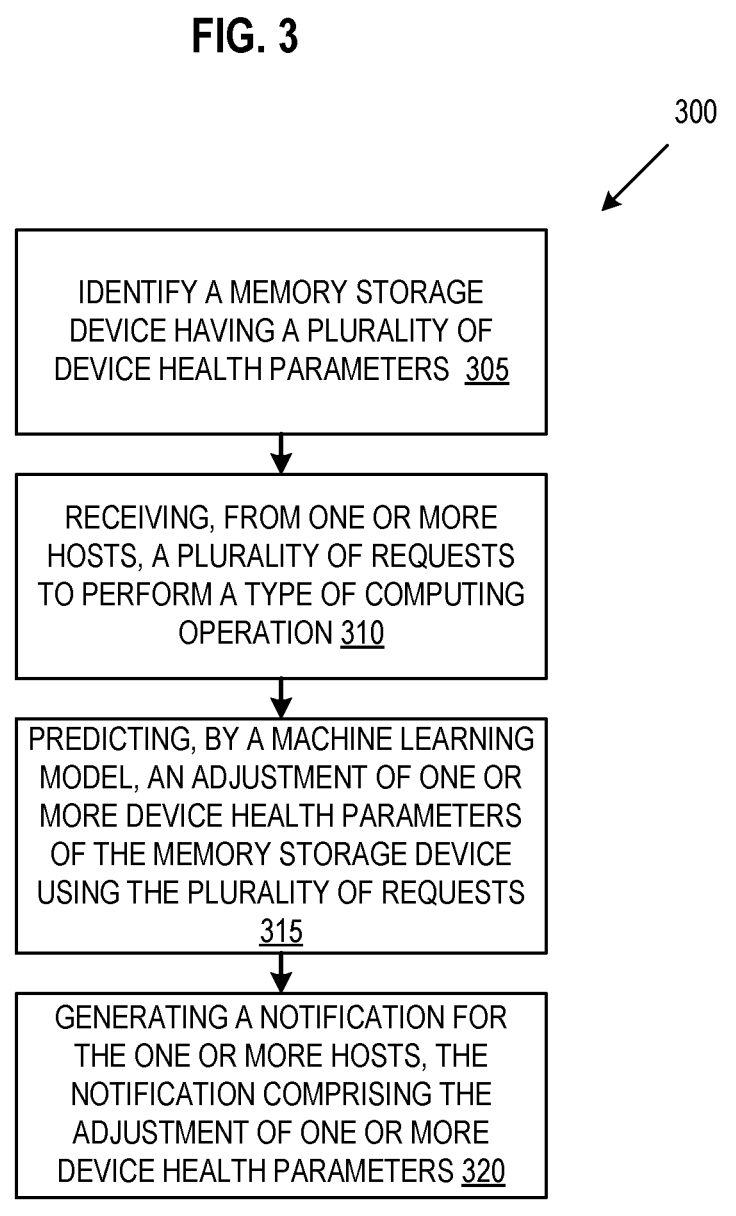

```
┌─────────────────────────────────┐
│   IDENTIFY A MEMORY STORAGE      │
│  DEVICE HAVING A PLURALITY OF    │
│ DEVICE HEALTH PARAMETERS  305    │
└─────────────────────────────────┘
                 │
                 ▼
┌─────────────────────────────────┐
│   RECEIVING, FROM ONE OR MORE    │
│  HOSTS, A PLURALITY OF REQUESTS  │
│ TO PERFORM A TYPE OF COMPUTING   │
│          OPERATION 310           │
└─────────────────────────────────┘
                 │
                 ▼
┌─────────────────────────────────┐
│ PREDICTING, BY A MACHINE LEARNING│
│  MODEL, AN ADJUSTMENT OF ONE OR  │
│ MORE DEVICE HEALTH PARAMETERS    │
│  OF THE MEMORY STORAGE DEVICE    │
│ USING THE PLURALITY OF REQUESTS  │
│               315                │
└─────────────────────────────────┘
                 │
                 ▼
┌─────────────────────────────────┐
│  GENERATING A NOTIFICATION FOR   │
│   THE ONE OR MORE HOSTS, THE     │
│  NOTIFICATION COMPRISING THE     │
│   ADJUSTMENT OF ONE OR MORE      │
│ DEVICE HEALTH PARAMETERS 320     │
└─────────────────────────────────┘
```

FIG. 4

LIFESPAN FORECASTING OF MEMORY DEVICES AND PREDICTIVE DEVICE HEALTH MANAGEMENT

CROSS-REFERENCE TO RELATED APPLICATION

The present application is a continuation of U.S. patent application Ser. No. 17/824,749 filed May 25, 2022, which is hereby incorporated by reference.

TECHNICAL FIELD

The present disclosure generally relates to quality of service of memory devices, and more specifically, relates to predictive device health management for memory devices.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 is a flow diagram of an example method of device health monitoring and lifespan management of a memory subsystem in accordance with some embodiments of the present disclosure.

FIG. 3 is a flow diagram of another example method of device health monitoring and lifespan management of a memory subsystem in accordance with some embodiments of the present disclosure.

FIG. 4 is a block diagram of an example computer system in which embodiments of the present disclosure may operate.

DETAILED DESCRIPTION

Figure 1:
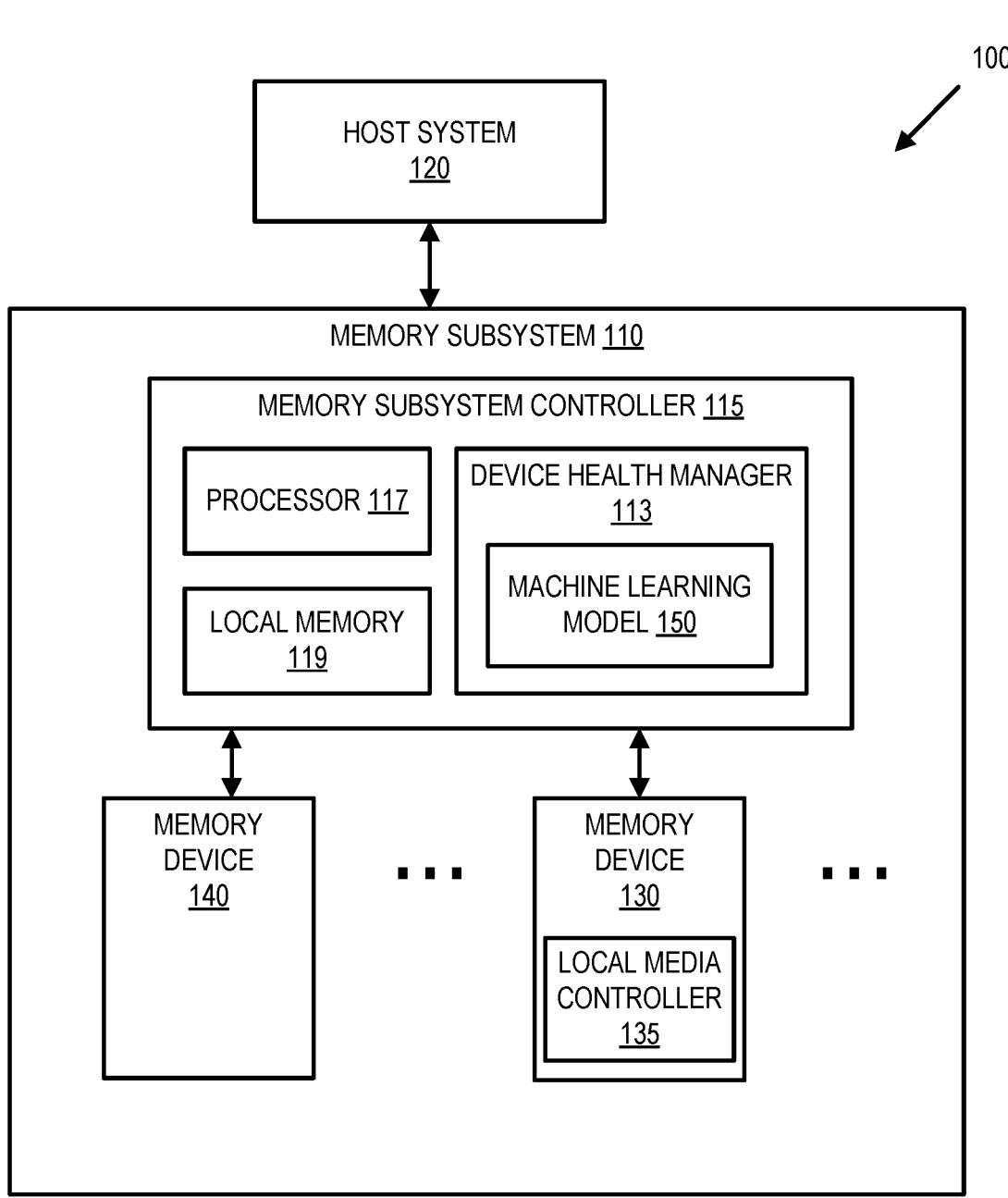
FIG. 1 illustrates an example computing system that includes a memory subsystem in accordance with some embodiments of the present disclosure.

Aspects of the present disclosure are directed to a device health manager in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dies. One example of non-volatile memory devices is a negative-and (NAND) memory device. Other examples of non-volatile memory devices are described below in conjunction with FIG. 1. The die in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, a SLC can store one bit of information and has two logic states.

Unlike some traditional enterprise applications for memory subsystems, such as solid-state drives (SSDs), meeting increasing performance demands from hosts such as in autonomous or assistive automotive technology systems is complex due to large amounts of sensor data being processed by local non-volatile memory storage and vehicle systems being integrated into a cloud computing ecosystem. Over the lifetime of a memory subsystem, host demands, and high-performance memory operations can negatively impact the lifespan of the memory subsystem. During run-time operations, the memory subsystem may generate frequent event log updates as a result of memory subsystem operations or host configuration changes. In typical systems, hosts can override default notification settings and disregard notifications from the memory subsystem. For example, a memory subsystem that is communicating with multiple hosts may receive payloads from multiple streams that results in performance demands which exceed a recommended performance metric of the memory subsystem and cause an error notification to be generated. Because each host defines performance requirements, error notifications resulting from other hosts may be discarded by a given host despite the error notification being related to proper functioning of the memory subsystem. However, this approach fails to account for impacts on performance of the memory subsystem caused by disregarding device health. As a result, the memory subsystem may unexpectedly fail or experience accelerated aging, which leads to increased replacement frequency or host data loss.

Aspects of the present disclosure address the above and other deficiencies by implementing device health management and generating predicted lifespans for the memory subsystem. The device health manager predicts a lifespan of the memory subsystem and updates the prediction through the monitoring of performance demands by various hosts requesting compute operations by the memory subsystem. The device health manager compares the predicted lifespan (and updated predictions) with a service life (e.g., an estimated lifespan at the time of manufacturing) of the device health parameter based on a manufacturing process and acceptable manufacturing deviations. A set of recommended configuration parameters is provided to the host that will extend the device health of the memory subsystem to the service life of the device health parameter. By recommending configuration parameters, the device health manager enables the host to determine and provide a selection of priority between higher performance and impacts on the memory subsystem lifespan. Accordingly, the device health manager adjusts configurations to preserve the memory subsystem lifespan or accepts a shorter service life of the memory subsystem.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130 and 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes a device health manager 113 that can monitor the health of a memory device(s) 130 using performance demands of one or more hosts and event logs of the memory device(s) 130. In some embodiments, the controller 115 includes at least a portion of the device health manager 113. For example, the controller 115 can include a processor 117 (processing device) configured to execute instructions stored in local memory 119 for performing the operations described herein. In some embodiments, a device health manager 113 is part of the host system 120, an application, or an operating system.

The device health manager 113 can monitor operation of the memory device(s) 130 to determine an impact of performance demands of the health of the memory device(s) 130. The device health manager 113 can monitor the event logs of the memory device(s) 130 for errors, failures, or other events that may impact the health of the memory device(s) 130. Examples of the health of the memory device(s) 130 include a predicted lifespan, I/O error counts, read path uncorrected data failures, safety mechanism trigger frequency (e.g., temperature threshold), latency to event triggers, and severity of impact of any special events. During runtime, the host system 120 requests the memory device(s) 130 to perform computing operations. The device health manager 113 analyzes the computing operations and determines an adjustment to the health of the memory device(s) 130.

In some embodiments, the device health manager 113 is configured to include a machine learning model 150 that predicts an adjustment value of a health parameter, such as a difference between the service life and a predicted lifespan of the memory device(s) 130. The machine learning model 150 predicts the adjustment value by aggregating multiple adjustment values computed for each event in the event log. In other instances, the device health manager 113 detects a health impacting event in the event logs of the memory device(s) 130 such as a read error, a number of grown bad blocks, an excessive temperature condition, or other failure. For instance, the device health manager 113 detects that a particular computing operation is performed and during execution, the temperature satisfies a threshold safety temperature of the memory device(s) 130. The device health manager 113 can determine the impact to device health or lifespan based on a severity of the threshold safety temperature. By applying the machine learning model 150, the device health manager 113 determines a change in the health of the memory device(s) 130. For changes that satisfy a threshold health change, the device health manager 113 generates a notification for the host system 120. The notification can include an adjustment to the service life and/or a set of recommended performance adjustments (e.g., do not perform a computing operation above the threshold safety temperature, increase latency, decrease bandwidth, etc.). The device health manager 113 generates the set of recommended performance adjustments using a predicted lifespan that corresponds to the service life. Additional details with regards to the operations of the device health manager 113 are described below.

As discussed above, the device health manager 113 includes the machine learning model 150. The machine learning model 150 is a trained prediction model, such as a neural network that is trained to predict a lifespan of a memory device(s) 130. The machine learning model 150 receives event logs or a set of computing operations from the memory device(s) 130. The machine learning model 150 generates a predicted lifespan using the event logs or the set of computing operations.

FIG. 2 is a flow diagram of an example method 200 of device health monitoring and lifespan management of a memory subsystem in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the device health manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. Additionally, while the example below includes specific values for clarity of explanation, these values should not be interpreted as limiting since each machine learning model generates values specific to the training process and input data set.

At operation 205, the device health manager obtains health data and a set of configuration parameters from the memory device 130. In some embodiments, the health data includes one or more of an event log, a set of device parameters, and/or a compliance requirement. The device health manager receives the event log from the memory device(s) 130. The event log includes any number of recorded events such as a read failure, a grown bad block, an operating temperature deviation, and other system related events. The set of device health parameters represent a current health of the memory device 130 and can include an error count, a frequency of safety activations, or a severity of impact associated with an event of the event log. Examples of configuration parameters include a payload size, a virtual function count, a physical function count, or response latency of the memory device(s) 130. An example of a compliance requirement is a set of one or more conditions that, when satisfied, negatively impact reliability of computing operations. For instance, a compliance requirement can include a temperature threshold and a number of occurrences of satisfying the threshold (e.g., operating above/below the temperature threshold). The device health manager may determine that the memory device(s) 130 is unable to meet the compliance requirement when the operating temperature satisfies the temperature threshold the specified number of times (e.g., 200° C., 2 or more times) after which the memory device(s) 130 should not be used for critical safety systems due to risk of physical damage.

In some embodiments, compliance parameters include varied thresholds and corresponding numbers of occurrences of satisfying those thresholds. For example, a memory device(s) 130 has a service life of 10 years under normal operating conditions. After manufacturing, the memory device(s) 130 initiates a runtime performance sequence. The device health parameters at the manufacturing time are a service life of 10 years, assuming compliance parameters stay within thresholds, e.g. including remaining temperature deviations of one occurrence of satisfying an extreme temperature threshold (e.g., T1), three occurrences of satisfying an elevated temperature threshold (e.g., T2), and ten occurrences of satisfying a minor temperature threshold (e.g., T3), as well as a compliance parameter of satisfying a threshold of ten errors. In some embodiments, the thresholds of the compliance parameters are configurable to be satisfied by individual events (e.g., a single T1 event renders the device unable to meet the compliance requirement for a 10-year service life) or a combination of events (e.g., two T2 and 6 T3 events render the device unable to meet the compliance requirement for a 10-year service life). The memory device(s) 130 generates an event log during runtime. In this example, the memory device(s) 130 generates an event log that includes (1) elevated temperature deviation (e.g., a T2), 3 minor temperature deviations (e.g., a T3), and (2) read errors.

At operation 210, the device health manager applies the machine learning model to the events in the event log, the set of device health parameters, and the configuration parameters. The machine learning model is trained to generate a lifespan adjustment factor for each event given the current set of device health parameters and the configuration parameters. The machine learning model uses the configuration parameters to represent the performance requirement over the lifespan. For example, an operating temperature deviation of a lower magnitude may be determined to have a larger impact on life expectancy for a device for which the device health parameters indicate a reduced lifespan or configuration parameters that indicate high performance demands prior to the temperature deviation. The machine learning model generates a lifespan adjustment for each event in the event log.

Continuing with the previous example, the machine learning model has received the event log including one (1) elevated temperature deviation (e.g., a T2), three (3) minor temperature deviations (e.g., a T3), and two (2) read errors. The machine learning model generates a lifespan adjustment for each of these events and determines that the adjustments are a shortening of 6 months for the elevated temperature deviation, a shortening of 10 days for each minor temperature deviations (i.e., 30 days total), and 2 days for each read error (i.e., 4 days total).

At operation 215, the device health manager generates, using the machine learning model, a predicted lifespan of the memory device(s) 130. The machine learning model aggregates the lifespan adjustments for each event, such as the lifespan adjustments determined at operation 210, and predicts an updated lifespan of the memory device(s) 130. For instance, the machine learning model uses the service life and the lifespan adjustments determined from the event log and the set of device health parameters to generate a predicted lifespan of the memory device(s) 130. Continuing with the previous example, the machine learning model generates a predicted lifespan of 9.4 years based on the device health parameters and the lifespan adjustments. Additionally, in a subsequent prediction, the machine learning model can use a set of stored device health parameters, the previously predicted lifespan, and a portion of the event log that is created after the previous prediction. In some embodiments, the device health manager computes a predicted lifespan from the output of the machine learning model (e.g., summing or otherwise aggregating the lifespan adjustments for each event).

In some embodiments, the machine learning model may generate a predicted lifespan that includes application of a weighting to the adjustment value for each event, that includes an amplification of an adjustment value for a particular event or that excludes an adjustment value for a certain type of event. For example, the machine learning model can learn that a temperature event has a 2-3× impact for a particular type of memory device(s) 130 or that a read error does not significantly impact the lifespan of the memory device(s) 130 and can be excluded from the prediction.

At operation 220, the device health manager compares the predicted lifespan with a service life. After the machine learning model generates a predicted lifespan at operation 215, the device health manager compares the predicted lifespan to the service life. The service life is a predetermined lifespan associated with a manufacturing process of the memory device(s) 130. Continuing with the previous example, the device health manager compares the service life of 10 years with the predicted lifespan of 9.4 years.

At operation 225, the device health manager determines whether the predicted lifespan is within or otherwise satisfies a threshold difference from the service life. For instance, the device health manager is configured to determine the significance of a predicted lifespan relative to the total device health of the memory device(s) 130.

In response to the device health manager determining that the threshold difference is not satisfied, the method 200 returns to operation 205. The memory subsystem continues to receive one or more additional requests from the hosts to perform one or more additional computing operations. The device health manager is configured to monitor the event log for additional events (e.g., at a subsequent time, periodically, in response to trigger events, etc.). The device health manager can perform operations 205, 210, 215, 220, and 225 in an iterative manner as described above to generate additional predicted lifespans (i.e., additional device health parameter values), incorporating the additional events.

In some embodiments, the device health manager uses a fixed time interval (e.g., 1 year, 18 months, etc.) as the threshold difference. In other embodiments, the device health manager uses a relative portion of service life (e.g., a difference equal to 10% or 15% of the service life). In yet other embodiments, the device health manager uses a relative portion of the lifespan as stored in the device health parameters which may include one or more adjustments. For instance, the lifespan of the memory device(s) 130 has been adjusted from 10 years down to 9 years and the value of 9 years is stored in the device health parameters. For a subsequent predicted lifespan of 8 years, then the relative portion would be 1 year, which is the difference between the 9 years in the device health parameters and the 8 year predicted lifespan.

In response to the device health manager determining that the threshold difference is satisfied, the method 200 continues to operation 230. Continuing with the previous example from operation 220, the device health manager determines that the difference between the predicted lifespan and the service life is 1.5 years. If the device health manager has a threshold difference of 6 months, the device threshold manager determines that the difference between the predicted lifespan and the service life satisfies the threshold difference, and the method 200 proceeds to operation 230.

At operation 230, the device health manager generates a set of recommended performance settings to mitigate the impact of the predicted lifespan. For example, the set of recommended performance settings can include an updated set of configuration parameters, that, when input to the machine learning model, result in an updated predicted lifespan equal to the service life. In some embodiments, the set of recommended performance settings result in a predicted lifespan equal to the lifespan stored in the device health settings. Continuing with the above example, the device health manager generates the set of recommended performance settings that reduces the bandwidth and increases the latency to reduce the operating temperature of the memory device(s) 130. The device health manager notifies the hosts of the predicted lifespan and the recommended set of performance settings.

At operation 235, the device health manager receives an updated set of configuration parameters from the host. For instance, the device health manager receives a response from the host that adjust or maintains the configuration parameters in response to the set of recommended performance settings generated at operation 230. The updated set of configuration parameters is based on the requirement for computing operations demanded/requested by the host. In one example, the updated configuration parameters include a reduction in bandwidth that is acceptable to the host but not an increase in latency. In this example, the lifespan of the memory device(s) 130 will be reduced from the service life at least until the next cycle of monitoring. However, the monitoring process provides the host an optimization of demand satisfaction and lifespan of the memory device(s) 130.

FIG. 3 is a flow diagram of an example method 300 of managing a device health monitoring and lifespan management of a memory subsystem in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the device health manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the device health manager identifies a memory device (such as memory device(s) 130) having a plurality of device health parameters. The device health manager identifies the memory device for enrollment in device health management. The identification can include determining a set of device health parameters as described above and may also include a hardware identifier or a date of manufacture.

At operation 310, the device health manager monitors the health data of the memory device. As described above, the health data can include one or more of an event log, a set of device parameters, and/or a compliance requirement. In one embodiment, the health data is generated by the memory device in response to outcomes (e.g., a failure, error, operating temperatures outside of a threshold range, etc.) of requests to perform computing operations from one or more hosts. The requests to perform computing operations include one or more of a read, write, or erase operation of data from memory. As described with regard to operation 305, the memory device executes the computing operation in response to the requests and generates an event log (or other health data) based on the outcome of each computing operation. The device health manager can detect newly generated health data or receive a periodic summary of the health data.

At operation 315, the device health manager predicts, using a machine learning model, an adjustment of a service life (e.g., to determine a predicted lifespan). As described above with regards to operations 210, 215, and 220, the device health manager generates a prediction of lifespan, or other health parameters using the computing operations and the event log based on the outcome of each computing operation.

At operation 320, the device health manager generates a notification for the one or more hosts including an adjustment to one or more of the device health parameters. As described with regard to operation 230, the notification includes a predicted lifespan and/or a recommended set of performance settings that include one or more adjustments from the current configuration parameters. The recommended performance settings are predicted to extend the device health to the service life estimated at completion of the manufacturing of the memory device.

Figure 4:
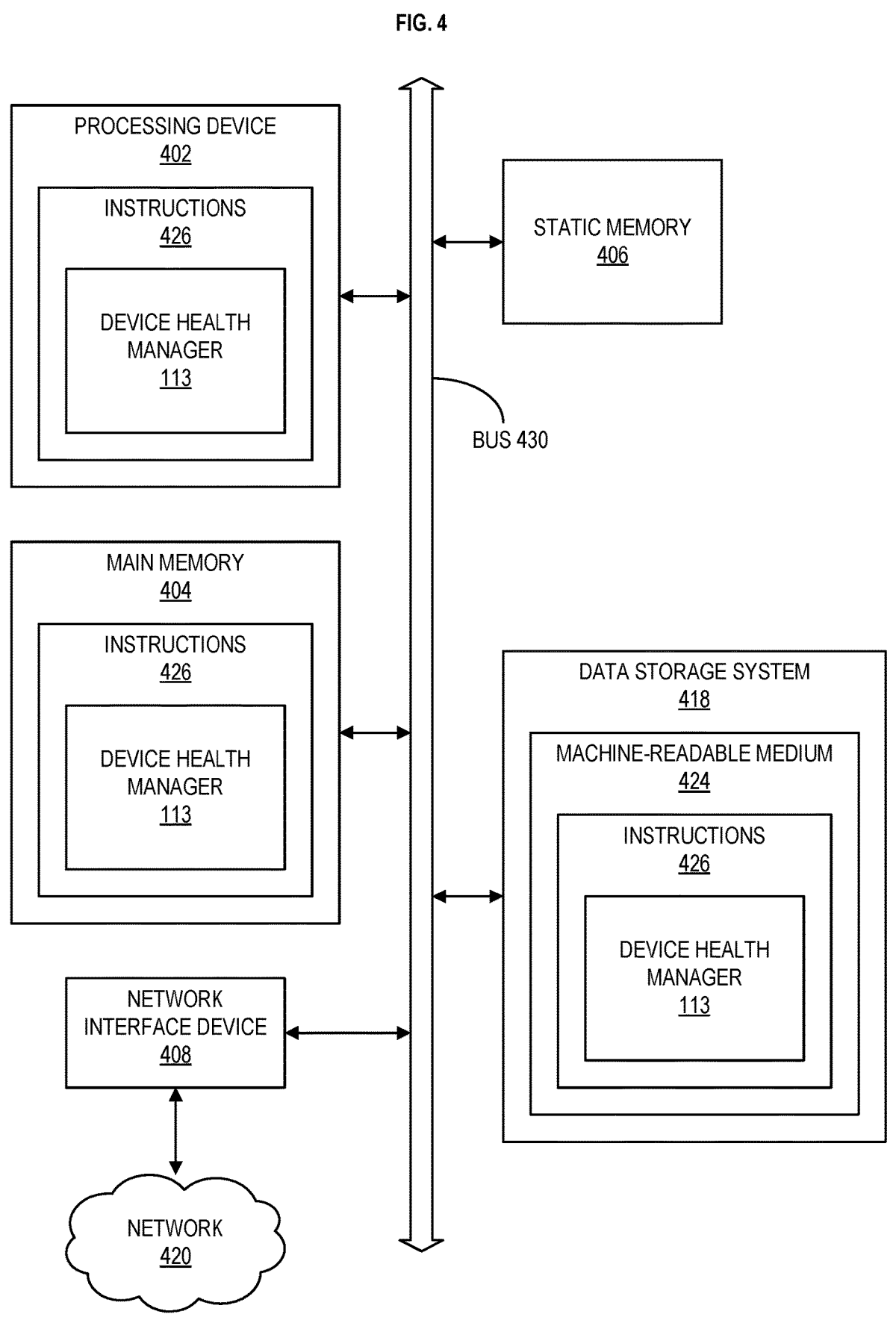

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the device health manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory subsystem 110 of FIG. 1.

In one embodiment, the instructions 426 include instructions to implement functionality corresponding to a device health manager (e.g., the device health manager 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the memory subsystem controller 114, may carry out the computer-implemented methods 200 or 300 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   obtaining an event log and a compliance requirement for a memory device, wherein the compliance requirement includes a temperature threshold for the memory device;
   generating, using a machine learning model, a current predicted lifespan of the memory device using the event log, the compliance requirement, and a current set of configuration parameters, wherein the current set of configuration parameters includes a current bandwidth for the memory device and a current response latency;
   determining that the current predicted lifespan is less than a service life of the memory device using the event log and the compliance requirement;
   generating, in response to the determination, a recommended set of configuration parameters, wherein the recommended set of configuration parameters includes a recommended bandwidth for the memory device that is less than the current bandwidth and a recommended response latency that is the same as the current response latency;
   generating, by the machine learning model, an updated predicted lifespan of the memory device using the event log, the compliance requirement, and the recommended set of configuration parameters;
   notifying one or more hosts of the recommended set of configuration parameters; and
   receiving, from the one or more hosts, an updated set of configuration parameters in response to the notification.

2. The method of claim 1, wherein determining that the current predicted lifespan is less than the service life of the memory device includes determining that a threshold difference between the current predicted lifespan and the service life is satisfied.

3. The method of claim 1, wherein generating the current predicted lifespan comprises:
   obtaining a set of device health parameters; and
   applying the machine learning model to the event log, the set of device health parameters, the compliance requirement, and the current set of configuration parameters.

4. The method of claim 3, wherein the set of device health parameters includes one or more of: an error count, a frequency of safety activations, and/or a severity of impact associated with an event of the event log.

5. The method of claim 1, wherein the current set of configuration parameters further includes one or more of a current payload size.

6. The method of claim 1, wherein the notification further includes a difference between the service life and the updated predicted lifespan.

7. The method of claim 1, wherein the current set of configuration parameters further includes one or more of a current virtual function count and/or a current physical function count.

8. A non-transitory computer-readable storage medium comprising instructions that, when executed by a processing device, cause the processing device to:
   obtain an event log and a compliance requirement for a memory device, wherein the compliance requirement includes a temperature threshold for the memory device;
   generate, using a machine learning model, a current predicted lifespan of the memory device using the event log, the compliance requirement, and a current set of configuration parameters, wherein the current set of configuration parameters includes a current bandwidth for the memory device and a current response latency;
   determine that the current predicted lifespan is less than a service life of the memory device using the event log and the compliance requirement;
   generate, in response to the determination, a recommended set of configuration parameters, wherein the recommended set of configuration parameters includes a recommended bandwidth for the memory device that is less than the current bandwidth and a recommended response latency that is the same as the current response latency;
   generate, by the machine learning model, an updated predicted lifespan of the memory device using the event log, the compliance requirement, and the recommended set of configuration parameters;
   notify one or more hosts of the recommended set of configuration parameters; and
   receive, from the one or more hosts, an updated set of configuration parameters in response to the notification.

9. The non-transitory computer-readable storage medium of claim 8, wherein determining that the current predicted lifespan is less than the service life of the memory device includes determining that a threshold difference between the current predicted lifespan and the service life is satisfied.

10. The non-transitory computer-readable storage medium of claim 8, wherein generating the current predicted lifespan comprises:
   obtaining a set of device health parameters; and
   applying the machine learning model to the event log, the set of device health parameters, the compliance requirement, and the current set of configuration parameters.

11. The non-transitory computer-readable storage medium of claim 10, wherein the set of device health parameters includes one or more of: an error count, a frequency of safety activations, and/or a severity of impact associated with an event of the event log.

12. The non-transitory computer-readable storage medium of claim 8, wherein the current set of configuration parameters further includes one or more of a current payload size.

13. The non-transitory computer-readable storage medium of claim 8, wherein the current set of configuration parameters further includes one or more of a current virtual function count and/or a current physical function count.

14. The non-transitory computer-readable storage medium of claim 8, wherein the notification further includes a difference between the service life and the updated predicted lifespan.

15. A system comprising:
a memory device; and
a processing device, operatively coupled with the memory device, to:
obtain an event log and a compliance requirement for the memory device, wherein the compliance requirement includes a temperature threshold for the memory device;
generate, using a machine learning model, a current predicted lifespan of a memory device using the event log, the compliance requirement, and a current set of configuration parameters, wherein the current set of configuration parameters includes a current bandwidth for the memory device and a current response latency;
determine that a threshold difference between the current predicted lifespan and a service life of the memory device is satisfied using the event log and the compliance requirement;
generate, in response to the determination, a recommended set of configuration parameters, wherein the recommended set of configuration parameters includes a recommended bandwidth for the memory device that is less than the current bandwidth and a recommended response latency that is the same as the current response latency;
generate, by the machine learning model, an updated predicted lifespan of the memory device using the event log, the compliance requirement, and the recommended set of configuration parameters;
notify one or more hosts of the recommended set of configuration parameters; and
receive, from the one or more hosts, an updated set of configuration parameters in response to the notification.

16. The system of claim 15, wherein generating the current predicted lifespan comprises:
obtaining a set of device health parameters; and
applying the machine learning model to the event log, the set of device health parameters, the compliance requirement, and the current set of configuration parameters.

17. The system of claim 16, wherein the set of device health parameters includes one or more of: an error count, a frequency of safety activations, and/or a severity of impact associated with an event of the event log.

18. The system of claim 15, wherein the current set of configuration parameters further includes a current payload size.

19. The system of claim 15, wherein the notification further includes a difference between the service life and the updated predicted lifespan.

20. The system of claim 15, wherein the current set of configuration parameters further includes one or more of a current virtual function count and/or a current physical function count.

* * * * *